Jan. 23, 1968  D. D. PATTERSON  3,365,210
BABY STROLLERS
Filed March 28, 1966  2 Sheets-Sheet 1
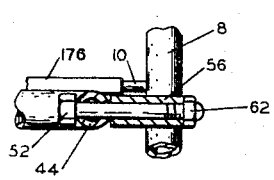
FIG. 5
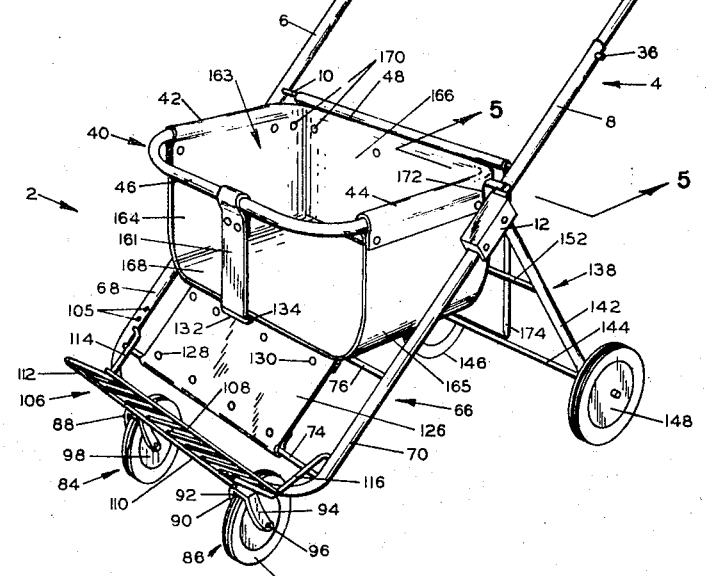
FIG. 1
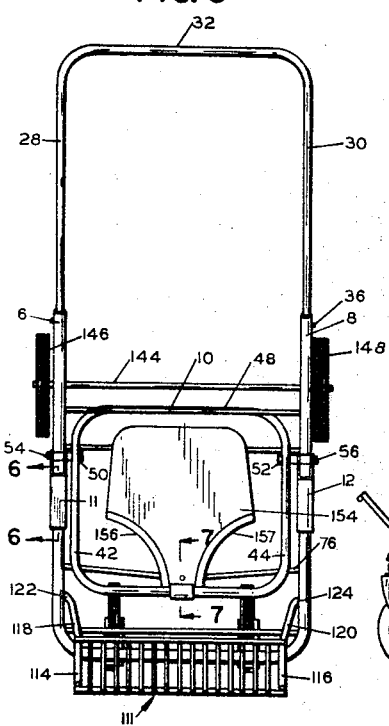
FIG. 3
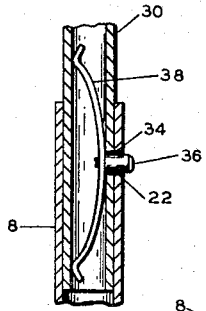
FIG. 4
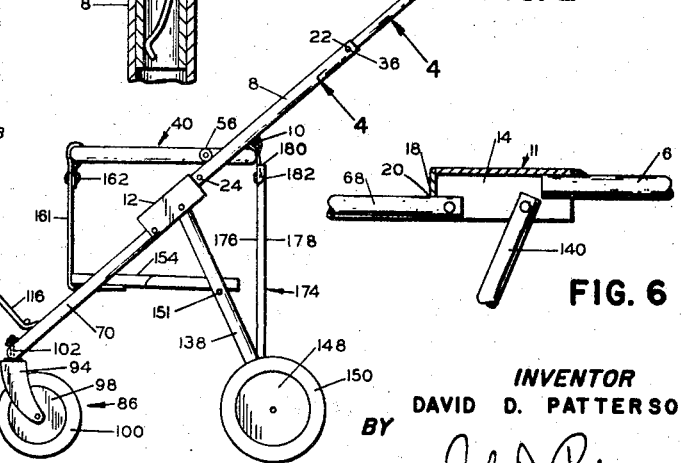
FIG. 2
FIG. 6
INVENTOR
DAVID D. PATTERSON
BY
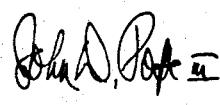
ATTORNEY Jan. 23, 1968   D. D. PATTERSON   3,365,210
BABY STROLLERS
Filed March 28, 1966   2 Sheets-Sheet 2
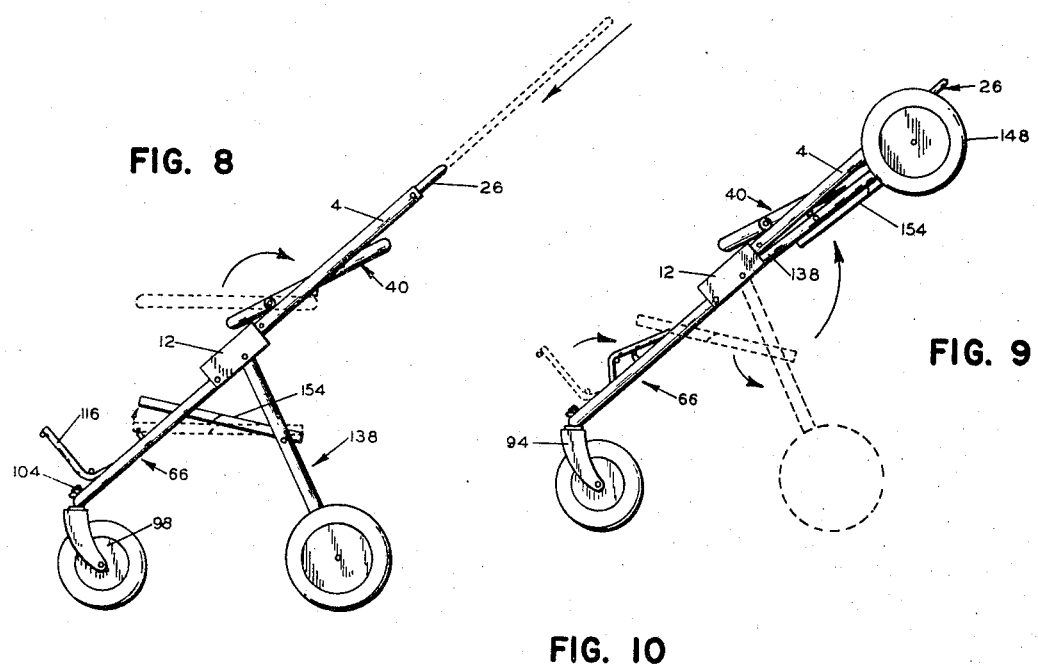
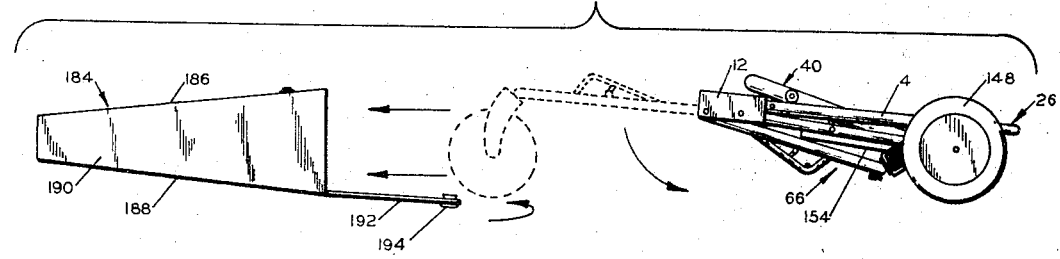
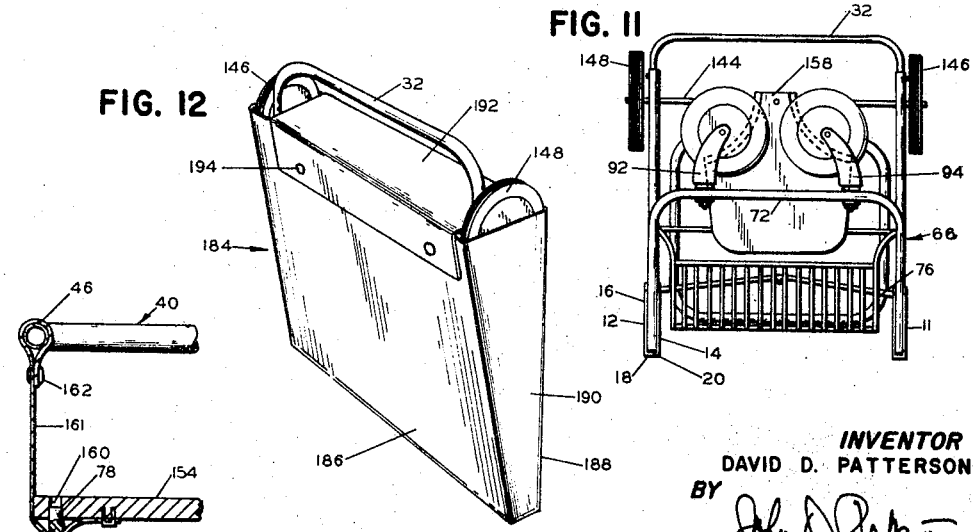
INVENTOR
DAVID D. PATTERSON
BY
ATTORNEY United States Patent Office 3,365,210
Patented Jan. 23, 1968

3,365,210
BABY STROLLERS
David D. Patterson, Seward, Nebr., assignor to Herschal F. Garhan, Rising City, Nebr.
Filed Mar. 28, 1966, Ser. No. 537,956
9 Claims. (Cl. 280—36)

ABSTRACT OF THE DISCLOSURE

A baby stroller including U-shaped upper, front, and rear frames, which fold over into side-by-side relation to one another to form a highly compact carrying package. A seat interconnects the front and rear frames for holding them at a predetermined angle, but is detachable from the front frame so that the frames can be folded. A handrail is hingedly connected to the upper frame and folds from a position wherein it lies flat with respect to the upper frame to a position wherein it projects forwardly therefrom above the seat so as to be capable of encircling a child's torso. A strap depends from the front bar of the handrail and at its opposite end passes beneath a cross-strut on the front frame, thereby holding the handrail and upper frame at a predetermined angle with respect to the front and rear frames. A seat liner attaches to the handrail and covers the seat.

---

This invention relates in general to baby strollers and, more particularly, to collapsible baby strollers.

A number of different types of baby strollers are currently being marketed and some of these strollers are collapsible to a certain extent to more conveniently enable the user to fit the stroller into restricted areas such as automobile trunks or hall closets. These baby strollers, however, often incorporate a multitude of lock-type fasteners and other devices to achieve this end and these devices are often difficult to manipulate, subjecting the user of the stroller to considerable inconvenience when that person desires to collapse it. Moreover, such strollers do not collapse into a highly compact, lightweight package which can be conveniently grasped and carried onto a bus or other vehicle where space is at a premium. On the contrary, most of the collapsible baby strollers of current manufacture merely depress into a variety of relatively compressed configurations which are too long and awkward to carry any appreciable distance by hand and, furthermore, have numerous protrusions which can easily snag clothing, catch on objects, and cause painful cuts and abrasions.

Generally speaking, the present invention relates to a baby stroller having front and rear frames which are hingedly connected to an upper frame at the lower extremity of such upper frame. A seat is hingedly fastened to one of the cross rods on the upper frame and has a forwardly projecting tongue which engages a locking stud formed on the front frame so as to hold the front and rear frames in properly spaced angular relation to one another. Interconnecting the tongue and a handrail secured to the upper frame is a strap which holds the upper frame in proper angular relation to the front and rear frames. When it is desired to transform the stroller of the present invention into a compact carrying package, the strap is merely released and the tongue disengaged from the stud, whereupon the front and rear frames can be folded over onto the upper frame to form a compact carrying package.

Among the several objects of the present invention may be noted the provision of a baby stroller which can be collapsed into a compact package for convenient carrying; the provision of a baby stroller of the type stated which collapses to a carrying package conveniently adapted for grasping and having no awkward protuberances to snag clothing or cause other damage; the provision of a baby carriage which employs simple and easily manipulated locking means to hold it in the erect position; and the provision of a baby stroller which is attractive in appearance, simple and rugged in construction, and easy to manufacture. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention are illustrated, FIG. 1 is a perspective view of a baby carriage constructed in accordance with and embodying the present invention;

FIG. 2 is a side elevational view of the baby carriage showing the structural members thereof, the fabric portions, other than the parcel carrier which is shown in phantom, being omitted;

FIG. 3 is a top plan view of the baby carriage showing the structural portions thereof, the fabric portions being omitted;

FIG. 4 is a sectional view taken along line 4—4 of FIG. 2;

FIG. 5 is a sectional view taken along line 5—5 of FIG. 1;

FIGS. 6 and 7 are sectional views taken along lines 6—6 and 7—7, respectively, of FIG. 3;

FIGS. 8, 9, and 10 are side elevational views, partially in phantom, sequentially showing the steps of collapsing the baby stroller of the present invention;

FIG. 11 is a plan view of the collapsed baby stroller; and

FIG. 12 is a perspective view of the collapsed baby stroller fitted into its carrying case.

Corresponding reference characters indicate corresponding parts throughout the several view of the drawings.

Referring now in more detail and by reference characters to the drawings, which illustrate a preferred embodiment of the present invention, 2 designates a baby stroller having an upper frame 4 including tubular side members 6, 8, which are transversely connected intermediate their ends by a cross-member 10, cross-member 10 being welded at its ends to the downwardly presented portions of the peripheral surfaces of side members 6, 8, so as to maintain such side members in correctly spaced parallel relation to each other. Welded, brazed, or otherwise rigidly fastened to side mmebers 6, 8, and projecting axially therebeyond are U-shaped hinge brackets 11, 12, each integrally including spaced parallel side plates 14, 16, which project downwardly in substantially tangential relation to the outer peripheral surfaces of their respective side members 6, 8, so as to more or less envelope the ends of such side members. At their downwardly presented ends hinge brackets 11, 12, are provided with closure-forming end caps 18 which are welded or otherwise securely fastened to the end margins of side plates 14, 16. As will be seen by reference to FIG. 6, each end cap 18 extends downwardly and terminates in an abutment margin 20 located in upwardly spaced relation to the bottom margins of side plates 14, 16. At their upper ends, tubular side members 6, 8, are provided with outwardly opening apertures 22, and similarly at their lower ends, in close proximity to hinge brackets 11, 12, with outwardly facing apertures 24.

Telescopically fitted within upper frame 4 is a U-shaped tubular handle 26 including legs 28, 30, which are slidably received by tubular side members 6, 8, legs 28, 30, being connected at their upper ends by a transversely extending gripping portion 32 formed integrally therewith.

Referring now to FIG. 4, legs 28, 30, in close proximity to their free ends, are each provided with outwardly facing axially aligned apertures 34 having cylindrical buttons 36 slidably fitted therein, buttons 36 being biased outwardly by leaf-type spring elements 38 which are mounted internally of legs 28, 30, where they bear against the walls thereof. Spring-loaded buttons 36 are sized and located for engagement with apertures 22, 24, so as to lock handle 26 to frame 4 when in engagement with such apertures. It is readily apparent that handle 26 assumes an extended position when buttons 36 engage apertures 22 and a retracted position when they engage apertures 24. In the former position gripping portion 32 is presented at a level above the ground convenient for pushing stroller 2, while in the latter position it is located in close proximity to the ends of side members 6, 8, for convenient carrying. To change handle 26 from the retracted position to the extended position or vice-versa, the user need only press button 36 inwardly through apertures 22 or 24, as the case may be, until the heads thereof pass beyond the tubular wall of the respective side members 6, 8, whereupon handle 26 is either pushed or pulled until buttons 36 engage the other set of apertures 22 or 24.

Swingably fastened to frame 4 for limited rotation between side members 6, 8, is a substantially rectangular upper member or handrail 40 sized to encircle a child's torso and integrally including side bars 42, 44, a front bar 46 and a rear bar 48 which aligns with and abuts against the underside of cross-member 10. Intermediate their ends, side bars 42, 44, are fitted with bolts 50, 52, having coaxial shanks which project outwardly where they are journaled in mounting sleeves 54, 56, located on the upwardly presented portion of the peripheral surface of side members 6, 8, in forwardly spaced relation to cross-member 10. The inclination of tubular side members 6, 8, the location of sleeves 54, 56, with respect to cross-member 10, and the spaced relation between bolts 50, 52, and rear bar 48 should be such that rear bar 48 will abut against the underface of cross-member 10 in which position handrail 40 will be substantially horizontal. Sleeves 54, 56, project inwardly beyond the peripheral margins of side members 6, 8, so as to prevent side bars 42, 44, from engaging side members 6, 8, of upper frame 4. Threaded over the outwardly projecting ends of bolts 50, 52, to hold such bolts in place are acorn nuts 62.

Hingedly secured to frame 4 at hinge brackets 11, 12, by means of hinge pins 64 is a front frame 66 integrally including spaced parallel side legs 68, 70, which at their forwardmost extremities arcuately merge into a transversely extending forward cross-member 72. At their opposite ends, legs 68, 70, are journaled to hinge brackets 11, 12, for pivotal movement intermediate side plates 14, 16, thereof on hinge pins 64. The axes of hinge pins 64 is located slightly rearwardly of, and downwardly from, end caps 18 so that abutment margins 20 will engage the upper portions of the peripheral surfaces of legs 68, 70, and prevent rotation of legs 68, 70, beyond that limiting point. In this connection, it should be noted that legs 68, 70, and side members 6, 8, of upper frame 4 will be substantially parallel when legs 68, 70, engage abutment margins 20. Legs 68, 70, are free to fold rearwardly between side plates 14, 16, of hinge brackets 11, 12, until they are located in closely spaced side-by-side relation with side members 6, 8. Welded to the arcuate junctures of legs 68, 70, and forward cross-member 72 in parallel relation to such cross-member is a support strut 74 and similarly fastened to legs 68, 70, in slightly downwardly spaced relation from hinge brackets 11, 12, is an outwardly bowed cross-strut 76 which is centrally provided with an upstanding pin or stud 78.

In close proximity to its ends forward cross-member 72 is provided with vertically extending holes 80, 82, having caster-type wheel assemblies 84, 86, journaled therein. More particularly, each of wheel assemblies 84, 86, includes a fork 88 having a bight portion 90 and spaced parallel furcations 92, 94, which project downwardly in inclined relation to bight portion 90 so that the ends of such furcations are located in offset relation to bight portion 90. Journaled intermediate furcations 92, 94, on an axle 96, which extends between the ends thereof, is a wheel 98 provided with a rubber tire 100. Rigidly secured to the center of each bight portion 90 is an upstanding pintle 102, the extreme end of which is provided with threads for preferably accepting an elastic-type stop nut 104. Pintles 102 of wheel assemblies 84, 86, rotatably fit within vertical holes 80, 82, and inasmuch as axles 96 of wheels 98 are offset from pintles 102, such axles will always assume a position perpendicular to the direction in which stroller 2 is pushed.

Legs 68, 70, slightly upwardly from support strut 74, are provided with a plurality of inwardly facing longitudinally spaced opposed apertures 105 for swingably fastening a treadle 106 to front frame 66. Treadle 106 comprises inner and outer parallel longitudinal rods 108, 110, respectively, which are transversely connected intermediate their ends by a plurality of grid-forming wirelike elements 111 in the formation of a foot rest 112. At their ends, rods 108, 110, are spot-welded or otherwise securely fastened to end rods 114, 116, which are bent upwardly substantially normal to foot rest 112 in the provision of connecting portions 118, 120, respectively, which, in turn, are bent outwardly perpendicular to the axes of legs 68, 70, in the provision of hooks 122, 124, as best seen in FIGS. 1 and 3. Hooks 122, 124, engage an axially aligned set of opposed apertures 105, the position of foot rest 112 on front frame 66 being dependent on the set of apertures 105 which are selected. Moreover, treadle 106 can fold over to a position in which grid-forming wire-like elements 111 engage cross-strut 76 and inner longitudinal rod 108 is presented outermost.

Fitted within the rectangular area defined by legs 68, 70, cross-strut 76 and support strut 74 is a fabric cover panel 126, the lower end portion of which is folded over support strut 74 and secured to the back face of panel 126 by means of conventional snaps 128. Similarly the upper end portion of cover panel 126 is folded over cross-strut 76 and fastened to itself by means of snaps 130. Moreover, along its upper margin, fabric panel 126 is centrally cut away in the provision of a notch 132, the lower margin of which is located in downwardly spaced relation to cross-strut 76 in the formation of an elongated aperture 134 therewith.

Also hingedly secured to upper frame 4 at hinge brackets 11, 12, by means of hinge pins 136 is a rear frame 138 having rearwardly inclined legs 140, 142, which are normally located slightly less than perpendicular to side members 6, 8. Extending through the lower extremities of legs 140, 142, and rigidly welded or otherwise secured thereto, is an axle 144 which rotatably carries wheels 146, 148, each having a rubber tire 150, wheels 146, 148, being held on axle 144 by means of friction caps, cotter pins or any other suitable fastening device. Intermediate their ends, legs 140, 142, are provided with inwardly opening axially aligned opposed apertures 151, the common axis of which is located in spaced parallel relation to cross-strut 76 and at an equal height above the ground. Journaled within apertures 151 is a rod-like seat support 152 to which a seat 154 is securely fastened, seat 154 being formed from wood, fiberglass, metal or any other suitable rigid material. Seat 154 is provided with converging forward margins 156, 157, which define a forwardly projecting tongue 158 having a vertically extending bore 160, bore 160 being sized and laterally located to accept upstanding stud 78 formed on cross-strut 76. Securely stapled or otherwise fastened to the underside of tongue 158 slightly to the rear of bore 160, as will be seen by reference to FIG. 7, is a tie strap or member-in-tension 161 which is preferably formed from strong fabric. Strap 161 extends beneath cross-strut 76, through elongated aperture 134 in cover panel 126 and then upwardly past the forward end of tongue 158 to front bar 46 of handrail 40, over which it is folded and fastened to itself by means of snaps 162. Referring again to FIG. 2, it can be seen that strap 161 actually holds stroller 2 in the erect position. More particularly, it urges front bar 46 of handrail 40 downwardly, thereby inducing an upwardly directed force at rear bar 48 which bears against the underside of cross-member 10 so as to, in effect, apply a counterclockwise torque to upper frame 4 about hinge pins 64, reference being made to FIG. 3. This torque urges abutment margins 20 formed on end caps 18 of hinge brackets 11, 12, into engagement with the upper portions of legs 68, 70, so that such legs are parallel to and more or less form a continuation of tubular side members 6, 8, respectively. Front frame 66 and rear frame 138 are held at a predetermined angle with respect to one another by horizontally extending seat 154 which is secured to rod-like support 152 at one end and engages cross-strut 76 at its other end. Furthermore, strap 161 extends beneath cross-strut 76 and thereby urges tongue 158 down into engagement with the upper surface of cross-strut 76. It should be understood that strap 161 need not be manufactured from a fabric material, but, with slight modifications, can be constructed from a suitable metal or synthetic resin.

Secured to handrail 40 is a fabric seat liner 163 having side panels 164, 165, marginally connected to a back panel 166 and a seat panel 168 which rests on the upper surface of seat 154 and extends over arcuate margins 156, 157, of tongue 158. The upper portions of side panels 164, 165, are folded over side bars 42, 44, and rear bar 48, respectively, of handrail 40 and fastened to their respective outwardly presented or back surfaces by means of snaps 170. Along their upper margins side panels 164, 165, are relieved in the provision of cut-outs 172 which accommodate sleeves 54, 56.

Depending from cross-member 10 is a bag-like parcel carrier 174 having front and rear panels 176, 178, which are marginally joined so as to form an upwardly presented opening 180. Front panel 176 extends beyond opening 180 where it is folded over cross-member 10, the extreme end portion thereof being tucked into opening 180 where it is fastened to the inner face of front panel 176 by means of snaps 182.

It should be understood that the various fabric portions of stroller 2, namely, cover panel 126, seat liner 163, and parcel carrier 174 can be sewed or otherwise secured to their respective supporting structures and this invention is not limited to snaps for fastening such fabric portions.

In use, baby stroller 2 is pushed along the pavement in the same manner as any other baby stroller. The child rests on seat 154 with his legs extended forwardly over the forward arcuate margins 156, 157, and downwardly against cover panel 126. His feet rest on treadle 106, the height of which can be adjusted by inserting hooks 122, 124, in different sets of opposed apertures 105, as previously noted, to suit children of varying stature. Handrail 40 encircles the child's torso and prevents him from falling out of stroller 2. Moreover, the child can grasp front bar 46 or side bars 42, 44, of handrail 40 to stabilize himself. Seat liner 163 further aids in keeping the child on seat 154. Small packages, garments, and the like can be conveniently carried to the rear of the child in parcel carrier 174.

When the user desires to board a bus, enter an automobile, or otherwise bring stroller 2 into a somewhat restricted area, stroller 2 can be quickly and easily transformed into a highly compact carrying package by the manipulation of a minimum number of locking devices, all as best seen in FIGS. 8 through 10. More particularly, buttons 36 projecting through apertures 22 are pressed inwardly while handle 26 is urged toward upper frame 4, whereupon legs 28, 30, of handle 26 will slide telescopically within tubular side members 6, 8, until buttons 36 engage apertures 24, in which position gripping portion 32 will be presented in close proximity to the upper ends of side members 6, 8. Snaps 162 are unfastened, thereby releasing strap 161 from front bar 46 of handrail 40 and handrail 40 is swung upwardly with respect to frame 4, reference being made to FIG. 8, until side bars 42, 44, engage the upper surface of cross-member 10, in which position handrail 40 and upper frame 4 present a more or less flat profile. Next, strap 161 is drawn through elongated aperture 134 and subsequently seat 154 is pivoted upward slightly until tongue 158 is free of stud 78.

Referring now to FIG. 9, rear frame 138 is thereafter grasped and rotated with respect to upper frame 4 until legs 140, 142, and tubular side members 6, 8, respectively, lie in side-by-side relation. This will draw seat 154 rearwardly, and after tongue 158 clears cross-strut 76, but before legs 140, 142, and side members 6, 8, are brought into side-by-side relation, seat 154 is rotated with respect to rear frame 138 until the underside of tongue 158 abuts against axle 144, whereby handrail 40, upper frame 4, rear frame 138, and seat 154 are presented in stacked or side-by-side relation to one another. Subsequently, treadle 106 is swung upwardly until grid-forming wire-like elements 111 engage cross-strut 76, in which position treadle 106 is presented in more or less overlying relation to front frame 66.

As will be seen by reference to FIG. 10, front frame 66 is thereafter swung toward the collapsed remaining portions of stroller 2 while caster wheel assemblies 84, 86, are rotated inwardly until the respective forks 88 thereof converge and wheels 98 are substantially coplanar with forward cross-member 72. When front frame 66 is folded against rear frame 138, a major portion of wheel assemblies 84, 86, will fit into the voids formed between axle 144 and forward arcuate margins 156, 157, of seat 154 as indicated by the dotted lines in FIG. 11.

FIGS. 8 through 10 sequentially show the position of the various elements of stroller 2 as it is being transformed from an erected position to a collapsed position while FIG. 11 shows the stroller in the collapsed position. In each of these figures, the fabric portions, namely, cover panel 126, seat liner 163, and parcel carrier 174 have been omitted so as not to obscure the positon of the various structural elements. It should be noted, however, that these fabric portions need not be detached for they merely fold to conform with the collapsed structural elements and do not in anyway impede the folding or collapsing of such elements.

Referring again to FIG. 10, and further to FIG. 12, the collapsed stroller 2 is fitted into a fabric carrying case 184 having front and back panels 186, 188, respectively, which are marginally connected to tapered side panels 190. Back panel 188 extends outwardly in the provision of a flap 192 which folds onto the outer face of front panel 186 where it can be optionally secured thereto by means of snaps 194. Inasmuch as stroller 2 assumes a somewhat tapered profile when folded, in which the hinge brackets 11, 12, form the narrow portion of the taper, hinge brackets 11, 12, form the narrow portion of the taper, hinge brackets 11, 12, of folded stroller 2 are inserted into carrying case 184 first, as best seen in FIG. 10. When stroller 2 is fully inserted into case 184 flap 192 is fitted between axle 144 and handle 26 as illustrated in FIG. 12. In this connection, it should be noted that the side margins of flap 192 are spaced inwardly from the unattached margins of side panels 190 so as to form elongated apertures therewith through which legs 28, 30, of handle 26 project as well as a portion of wheels 146, 148. Gripping portion 32 of handle 26 is presented outwardly beyond flap 192 and can be conveniently grasped so that collapsed stroller 2 can be carried onto a bus, lifted into the trunk of an automobile, or placed in a closet or other restricted area in a manner similar to an ordinary shopping bag. Carrying case 184 not only holds stroller 2 in the collapsed position but also prevents various protruding structural elements thereon from snagging clothing or damaging other objects. When stroller 2 is in the erected position, carrying case 184 can be carried in parcel carrier 174.

It is apparent from the foregoing that stroller 2 collapses into a highly compact, easy to carry, package, and the transformation from the erected position to the collapsed position or vice-versa is easily achieved merely by the manipulation of a few buttons, snaps and hinged structural members. When in the collapsed position, stroller 2 can be carried in a manner similar to a conventional shopping bag.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A collapsible baby stroller comprising an upwardly extending upper frame, a downwardly extending front frame hingedly mounted with respect to the upper frame at its upper end, a downwardly extending rear frame hingedly mounted with respect to the upper frame at its upper end, the upper frame being hingedly mounted at its lower end with respect to the front and rear frames so that the frames can be folded from an erected position to a collapsed position wherein the frames are in substantially side-by-side relation with respect to one another, the hinge joints mounting the frames being adjacent one another so that the frames fold from a substantially common location which, when the frames are folded to their collapsed position, is located at one end of the folded stroller, a rigid member connected to and extending between the front and rear frames for holding the front and rear frames at a predetermined angle with respect to one another, an upper member hingedly mounted for swinging movement from a collapsed position wherein it is substantially in side-by-side relation with the upper frame to an erected position wherein it projects outwardly from the upper frame at a predetermined angle with respect thereto, the upper member engaging the upper frame when in its erected position so as to prevent relative movement between the two in at least one direction, and holding means for holding the upper frame at a predetermined angle with respect to the other frames.

2. A baby stroller according to claim 1 wherein the holding means is a tie strap extending between the upper member and front frame.

3. A baby stroller according to claim 1 in which the rigid member is a seat.

4. A baby stroller according to claim 1 in which the front and rear frames are hingedly connected at their upper ends to the lower end of the upper frame.

5. A baby stroller according to claim 1 in which the rigid member is hingedly connected to the rear frame and detachably connected to the front frame.

6. A baby stroller according to claim 3 in which the upper frame comprises first and second spaced parallel side members, and a cross-member transversely connecting the side members intermediate their ends.

7. A baby stroller according to claim 6 in which the upper member is a handrail adapted to encircle a child's torso in upwardly spaced relation to the seat, the handrail integrally including a front bar, side bars rotatably connected to the side members intermediate the ends of such side bars, and a rear bar adapted to engage the underside of the cross-member of the upper frame when the handrail is rotated to a position in which the front bar is located in upwardly spaced relation to the front frame, the tie strap being adapted to engage the front bar so as to urge the rear bar into engagement with the cross-member and maintain the carriage in an erected position.

8. A baby stroller according to claim 7 in which the front frame comprises first and second spaced parallel legs hingedly connected to the first and second side members, respectively, of the upper frame, a cross-strut transversely connecting the legs, and a stud projecting upwardly from the cross-strut, the seat being provided with an aperture adapted to receive the stud, the tie strap being secured to the underside of the seat in rearwardly spaced relation to the aperture and extending beneath the cross-strut and then upwardly where it is releasably connected to the front bar of the handrail.

9. A baby stroller according to claim 6 in which the side members are tubular and the handle is telescopically mounted in the side members for movement from a retracted position to an extended position, the baby stroller being further characterized by means for releasably holding the handle in the retracted or extended positions.

References Cited

UNITED STATES PATENTS

| | | | |
|---|---|---|---|
| 2,886,337 | 5/1959 | Quisenberry | 280—36 |
| 3,100,652 | 8/1963 | Schenkman | 280—41 |

BENJAMIN HERSH, *Primary Examiner.*

L. D. MORRIS, *Assistant Examiner.*